United States Patent [19]

Hensel et al.

[11] Patent Number: 4,751,139

[45] Date of Patent: Jun. 14, 1988

[54] BIAXIALLY ORIENTED FILM HAVING HIGH SCRATCH AND ABRASION RESISTANCE

[75] Inventors: Hartmut Hensel, Schlangenbad; Hermann Dallmann, Wiesbaden; Werner Schaefer, Hofheim-Diedenbergen, all of Fed. Rep. of Germany

[73] Assignee: Hoechst Aktiengesellschaft, Frankfurt, Fed. Rep. of Germany

[21] Appl. No.: 831,239

[22] Filed: Feb. 19, 1986

[30] Foreign Application Priority Data

Mar. 5, 1985 [DE] Fed. Rep. of Germany ....... 3507729

[51] Int. Cl.$^4$ .................. B32B 5/16; B32B 27/36; B28B 21/54; C06G 63/02

[52] U.S. Cl. .................. 428/323; 264/177.19; 264/177.2; 264/211.12; 264/212; 428/480; 528/272; 528/308.2

[58] Field of Search ............... 428/480, 323, 147, 4.9; 528/308.2, 272; 264/211.12, 177.19, 177.2, 212, 342 RE

[56] References Cited

U.S. PATENT DOCUMENTS

| | | | |
|---|---|---|---|
| 3,577,510 | 5/1971 | Schmitz et al. | 264/342 RE |
| 4,398,642 | 8/1983 | Okudaira et al. | 428/480 X |
| 4,482,586 | 11/1984 | Smith et al. | 428/480 X |
| 4,489,117 | 12/1984 | Ono et al. | 428/147 |
| 4,508,782 | 4/1985 | Miura et al. | 428/409 |
| 4,535,025 | 8/1985 | Jabarin | 428/480 X |
| 4,606,976 | 8/1986 | Hensel et al. | 428/480 |

FOREIGN PATENT DOCUMENTS

3415835 4/1984 Fed. Rep. of Germany .

*Primary Examiner*—Thomas J. Herbert, Jr.
*Attorney, Agent, or Firm*—James C. Lydon

[57] ABSTRACT

A biaxially oriented and heat set film having improved abrasion resistance is described, whose distinguishing characteristics are that it has a density of more than 1.38 g/cm$^3$ and that the following relationship exists between the orientation birefringence ($\Delta n$), the reduced specific viscosity (RSV), and the temper peak (Tp) of the film:

$$RSV - |\Delta n| - Tp/250 \geq 0$$

with $|\Delta| = |n_{MD} - n_{TD}|$.

In addition, a process for manufacturing the abrasion resistant film is disclosed.

12 Claims, No Drawings

BIAXIALLY ORIENTED FILM HAVING HIGH SCRATCH AND ABRASION RESISTANCE

BACKGROUND OF THE INVENTION

This invention concerns a biaxially oriented and heat set film made from thermoplastic polyester material having improved abrasion resistance.

Films from thermoplastic materials are usually draw oriented in order to improve their mechanical properties; in particular, they are biaxially oriented, whereby the molecular chains of the polymers are oriented in two main directions. In order to impart satisfactory dimensional stability, these films are usually subjected to a heat setting process after the draw process. In this, the films are briefly heated to a temperature just below the melting temperature of the polymers used. Heat setting fixes the polymer chains in the orientation condition caused by the previous drawing. A film which has been heat set in this manner does not have any undesired shrinkage behavior when heated at a later time.

Apart from mechanical properties, additional criteria for thermoplastic films are their surface properties, such as slip properties, roughness, electrostatic charge, scratch resistance and abrasion resistance. There are many publications which disclose additives or coatings to improve sliding behavior and slip. Others describe an antistatic coating for films. Coatings and treatment methods to improve scratch and abrasion resistance are described in DE-OS No. 34 15 835, DE-OS No. 31 01 232 and EP-A- No. 0 074 750.

It has now been discovered that the scratch and abrasion resistance of thermoplastic films, especially of thermoplastic polyester films, is, inter alia, a function of the degree of crystallization of the film surface.

Based on this knowledge, the object of this invention is to develop a film from thermoplastic polyester material which has abrasion resistance superior to the current state of technology, as well as to describe a process for manufacturing such a film.

SUMMARY OF THE INVENTION

In one aspect, the present invention is a biaxially oriented polyester film having superior abrasion resistance, wherein the density of the film must be greater than 1.38 gram/cm$^3$ and the following relationship between the film's orientation birefringence ($\Delta n$), its reduced specific viscosity (RSV) and its temper peak (Tp) must be satisfied:

$$RSV - |\Delta n| - Tp/250 \geq 0$$

with $|\Delta n|$ equal to $|n_{machine\ direction} - n_{transverse\ direction}|$.

In another aspect, the present invention is a process for manufacture of a biaxially oriented, heat set polyester film having superior abrasion resistance comprising (i) extruding a polyester resin through a slot die, thereby forming a sheet-like extrudate;
(ii) cooling said sheet-like extrudate on a chill roll, thereby forming cast polyester sheet;
(iii) re-heating and biaxially orienting said cast polyester sheet, thereby forming biaxially oriented polyester film;
(iv) heat-setting said biaxially oriented polyester film at a temperature which does not exceed 200° C., with the proviso that said biaxially oriented, heat-set polyester film has a density greater than 1.38 g/cm$^3$.

DETAILED DESCRIPTION OF THE INVENTION

As summarized above, the film of the present invention must have a density of more than 1.38 g/cm$^3$ and the following relationship must exist between the orientation birefringence ($\Delta n$), the reduced specific viscosity (RSV) and the temper peak (Tp) of the film:

$$RSV - |\Delta n| - Tp/250 \geq 0$$

$$\text{with}\ |\Delta n| = |n_{MD} - n_{TD}|.$$

The degree of crystallization of a biaxially oriented polyester film is, in a first approximation, dependent upon three parameters:
the viscosity of the polymer used,
the orientation condition of the film,
the temperature and time span of the thermal post-treatment.

The viscosity of the polymer raw materials is given as reduced specific viscosity (RSV); measurement is performed according to DIN 53 728, Sheet 3. For biaxially oriented polyester films, the reduced specific viscosity value is generally between 0.65 and 0.85 dl/g. Especially high RSV values are achieved if the polyester polymer is especially well dried, for example by vacuum drying, before being processed into a film. Drying prevents degradation of the polyester chain by hydrolysis during film processing. In addition, care must be taken that no substantial polymer chain degradation occurs during extrusion by any shearing forces which may occur.

The orientation condition of the film is measured by the orientation birefringence ($\Delta n$) of the biaxially oriented films:

$$\Delta n = n_{MD} - n_{TD},$$

whereby $n_{MD}$ is the index of light refraction in the machine direction and $n_{TD}$ is the index of light refraction in the transverse direction.

The indices of light refraction may be determined in the usual manner using an Abbe-refractometer.

As discussed above, a film's mechanical properties are determined by its orientation condition. Isotropic or "balanced" films are films which have been drawn in both directions by the same factor or degree, and consequently exhibit mechanical properties which are approximately the same in both directions. For such films, almost equal values will be measured for $n_{MD}$ and $n_{TD}$, and the difference $\Delta n$ will then approximate zero.

Especially high mechanical properties in one primary direction are required for many film applications. "Anisotropic" films are stretched to a much higher degree in one direction and also have a much higher index of light refraction in this same direction in comparison to the other directions at right angles to it. The difference $\Delta n$ then takes on a concrete value.

The draw process for biaxially oriented polyester films, whether it is done in step-by-step manner or simultaneously in several directions at once, is capable of relatively few possibilities for variation. For example, certain minimum draw ratios must be exceeded in order to achieve good gauge uniformity of the film. In the simplest case all that is needed to describe the orientation condition is the difference between the indices of refraction, the orientation birefringence:

$$\Delta n = n_{MD} - n_{TD}.$$

The higher the orientation birefringence is, the higher is the anisotropy, and, furthermore, the higher is a mechanical property in a certain direction, MD or TD.

If $\Delta n$ is in the range $$-10 \times 10^{-3} \leq \Delta n \leq +10 \times 10^{-3}$$

then we speak of "isotropic" or "balanced" films. These make up the largest part of biaxially oriented polyethylene terephthalate films. If $\Delta n$ is less than $-10 \times 1.0^{-3}$, then we speak of "highly transverse drawn" films (or high TD-strength); if $\Delta n$ is greater than $10 \times 10^{-3}$, then they are "highly longitudinal drawn films" (or high MD strength).

For films very highly drawn in the machine direction, the value of $\Delta n$ can increase to over $50 \times 10^{-3}$.

The temperature and time period for thermal post-treatment of a film can be determined using the temper peak (Tp) in its differential scanning calorimeter curve. The temper peak (Tp) is a peak before the actual melting point, which results due to the breaking up of the crystallization state in the polymers forming the film. It is given in degrees Celsius. In order to determine the temper peak, a film sample (approximately 2.8 mg) is heated in a differential scanning calorimeter and the heat flow is plotted against the temperature.

Surprisingly, it has been shown that for films having especially good abrasion resistance the relationship between the parameters mentioned above must be within the range stated in claim 1. In particular, the value should lie between 0.01 and 0.5.

In addition, the density of films for which the relationship shown is applicable is more than 1.38 g/cm$^3$, as a result of their degree of crystallization.

The film can be manufactured from various polymers, preferably from a thermoplastic polyester. Polyester raw materials include polyester homo- and copolymers, mixtures of different polyesters as well as mixtures and blends of polyesters with other polymers.

The manufacture of the polyester can be performed either using the interesterification process with well known catalysts such as zinc, calcium, manganese, lithium, magnesium or germanium salts, or using the direct esterification process. Examples of polyesters include polyethylene terephthalate, polytetramethylene terephthalate, poly-1,4-cyclohexylene dimethyl terephthalate, and polyethylene 2,6-naphthalate.

The copolyesters can contain adipic acid, sebacic acid, phthalic acid, isophthalic acid, and sulfoisophthalic acid as components. The polyesters manufactured in the interesterification process may contain "internal particles", ie. particles of catalyst residue.

Examples of polymers which can be added to the polyester are polyolefin homo- or copolymers such as polypropylene, poly-4-methyl pentene, ethylene vinylacetate copolymers, which in turn can be saponified, ionomers, polyamides, polycarbonates, and fluorine-containing polymers.

Furthermore, the films can contain inorganic or organic additives, which will improve the static and sliding friction, abrasion resistance, and running behavior of the film. Examples of such additives include calcium carbonate, silicon dioxide, titanium dioxide, kaolin, fatty acid esters, polysiloxanes, nucleating agents such as alkali metal or alkaline-earth metal salts of ester waxes or partially saponified products thereof, benzoates and stearates.

The polymers and additives can be added using a concentrate, according to well known processes which need not be described in more detail. Alternatively, they can be added during the manufacture of the polyester.

Films of the type described above are normally manufactured by the melt extrusion process. In this process, the thermoplastic material is melted in extruders, pressed through a slot die onto a chill roll, cooled, reheated, biaxially drawn, heat set, slit and wound. For manufacturing the film of this invention, the heat-setting process is performed at especially low temperatures. To be specific, the temperature for heat setting the film should not exceed 200° C.

Since the scratch and abrasion resistance is determined only from the layers which are near the surface, an especially good effect can be achieved using a multi-layer construction. For example, a high-crystallizing polyethylene terephthalate polymer, which determines the dimensional stability of the film, may be used as the central layer, which can make up more than 80% of the total thickness. The values for relative specific viscosity, orientation birefringence and temper peak are determined only for the cover layer(s). Due to its better dimensional stability, such a multi-layer film is preferable to a monolayer film.

The coextrusion process is preferred for the manufacture of multi-layer films; in this, the thermoplastic melts which form the individual layers of the film are either brought together just at the outlet opening of the slot die or, using adapter technology, are brought into contact with one another before they enter the slot die using an adapter unit developed for this purpose.

The films of this invention are suitable for all applications in which high scratch and abrasion resistance are necessary. In particular, they are well suited for reprographic applications, and preferred as base materials for magnetic tapes or other magnetic storage materials. Furthermore, they can be used advantageously for metallizing by means of vapor coating or sputtering.

EXAMPLES

The following examples will serve to further illustrate the advantages of the present invention. These examples are intended merely to illustrate specific embodiments of the generic invention; in no case should the scope of the present invention be limited by the examples.

The abrasion behavior of the films was determined using a measurement apparatus in which a 12.5 mm wide film band with a constant tension (1N) is first drawn over a cleaning roll made from special rubber, to remove any surface contamination, is then drawn over a stationary deflection point from a cassette, and finally is led across two rubber rolls which serve as measurement rolls and wound up. The deposits of abraded material on the rubber rolls were evaluated using a measurement scale from 1-5, ranging from very good to inferior.

EXAMPLE 1

A polyethylene terephthalate polymer raw material containing 3000 ppm barium sulfate as a slip agent was melted, formed into a film using a slot die, and chilled to an amorphous film on a high-gloss polished chill roll with a surface temperature of 40° C. The cast film was then drawn in the machine direction at 95° C. and drawn in the transverse direction at 110° C., whereby the surface draw ratio was 13. The 14.5 μm thick film was then heat set at 230° C. tenter temperature. Table 1 shows the reduced specific viscosity, orienation birefringence, temper-peak and abrasion resistance determined from the final film.

EXAMPLES 2-4

A biaxially oriented 14.5 μm thick film as described in Example 1 was heat set during a trial series at tenter temperatures of 210° C., 195° C. and 190° C.

The data from these films are also included in Table 1. The $RSV - |\Delta n| - Tp/250 \geq 0$ relationship is fulfilled in Examples 3 and 4, and the abrasion resistance was correspondingly good.

EXAMPLE 5

One polyester, containing 4000 ppm calcium carbonate with an average particle size of 1.0 μm and having a relative specific viscosity of 0.840, and a polyester with a relative specific viscosity of 0.725 were separately dried in vacuum dryers at 160° C., melted separately from one another and extruded into a two-layer film, biaxially drawn in a step-by-step process, at 95° C. in the machine direction and 110° C. in the transverse direction, and heat set at a tenter temperature of 210° C. The two-layer film thus obtained had a total thickness of 14.5 μm, whereby the base layer was formed by the polyester having the lower relative viscosity and had a thickness of 13 μm; the thickness of the cover layer was 1.5 μm.

Table 1 contains the data on the individual layers. Only the cover layer had good abrasion resistance.

polyester, having an average particle size in the range of from 0.01 to 5.0 μm.

5. The film of claim 4 wherein said particles are selected from the group consisting of calcium carbonate, silicon dioxide, titanium dioxide, kaolin, and barium sulfate.

6. The film of claim 1, wherein the abrasion resistance of said film lies within the range from 1 to 3 in a measurement scale ranging from 1 through 5, with 1 being very abrasion resistant and 5 being inferior, whereby said abrasion resistance is determined by first drawing a film band with a constant tension over a cleaning roll, then drawing said film band with said constant tension over a stationary deflection point, leading said film band across two rubber rolls and finally evaluating the deposits of abraded material on said rubber rolls.

7. The film of claim 6, wherein said film band has a width of 12.5 mm.

8. The film of claim 6, wherein said constant tension is 1 N.

9. The film of claim 6, wherein said cleaning roll is made from rubber.

10. A process for manufacture of a biaxially, oriented head set polyester film comprising:
   (i) extruding a polyester resin through a slot die thereby forming a sheet-like extrudate;
   (ii) cooling said sheet-like extrudate on a chill roll, thereby forming cast polyeste sheet;
   (iii) reheating and biaxially orienting said cast polyester sheet, thereby forming biaxially oriented polyester film;
   (iv) heat setting said biaxially oriented polyester film at a temperature which dies not exceed 200° C., with the proviso that said biaxially oriented head set film have a density greater 1.38 g/cm² and with the further proviso tha the biaxial orienting and

TABLE 1

| | | | | | | |
|---|---|---|---|---|---|---|
| Example | Heat Set Temperature (°C.) | Tp °C. | $|\Delta n|$ | RSV (dl/g) | $RSV - |\Delta n| - \frac{Tp}{250}$ | Abrasion |
| 1 | 220 | 204 | $6.6 \times 10^{-3}$ | 0.761 | <0 | 5 |
| 2 | 210 | 191 | $4 \times 10^{-3}$ | 0.766 | <0 | 5 |
| 3 | 195 | 182 | $1.5 \times 10^{-3}$ | 0.761 | >0 | 1-2 |
| 4 | 190 | 186 | $1.8 \times 10^{-3}$ | 0.750 | >0 | 2 |
| 5 | 210 | 191 | $7 \times 10^{-3}$ | 0.820 | >0 | 2 (Cover Layer) |
| | | 189 | $1.3 \times 10^{-3}$ | 0.700 | <0 | 5 (Cover Layer) |

We claim:

1. A biaxially oriented and heat-set polyester film, wherein the density of said film must be greater than 1.38 g/cm³ and the following relationship between the film's orientation birefringence (Δn), its reduced specific viscosity, and its temper peak must be satisfied:

$$RSV - |\Delta n| - Tp/250 \geq 0$$

with $|\Delta n|$ equal to $|n_{machine\ direction} - n_{transverse\ direction}|$, such that said film possesses an abrasion resistance which is greater than polyester films whose density is 1.38 g/cm³ or less and whose orientation birefringence, reduced specific viscosity and temper peak do not satisfy the above relationship.

2. The film of claim 1 wherein the value which is calculated from said relationship between the film's orientation birefringence, its reduced specific viscosity, and its temper peak falls within a range from 0.01 to 0.5.

3. The film of claim 1, further comprising one or more film layers, with the proviso that the polyester film of claim 1 be a surface layer.

4. The film of claim 1 further comprising particles substantially homogeneously dispersed throughout said heat setting steps are performed in a manner which satisfies the following relationship between the film's orientation birefringence (ΔN), its reduced specific viscosity, and its temper peak:

$$RSV - |\Delta n| - Tp/250 \geq 0$$

with $|\Delta n|$ equal to $|n_{machine\ direction} - n_{transverse\ direction}|$, such that said film possessses an abrasion resistance which is greater than polyester films whose density is 1.38 g/cm³ or less and whose orientation birefringence, reduced specific viscosity and temper peak do not satisfy the above relationship.

11. The process of claim 10 wherein said polyester resin includes particles substantially homogeneously dispersed throughout said polyester, said particles having an average particle size in the range of from 0.01 to 5.0 μm.

12. The process of claim 11 wherein said particles are selected from the group consisting of calcium carbonate, silicon dioxide, titanium dioxide, kaolin, and barium sulfate.

* * * * *